(12) United States Patent
Vincent et al.

(10) Patent No.: US 7,007,915 B2
(45) Date of Patent: Mar. 7, 2006

(54) LOW ENERGY FLUID ACTUATOR CONTROL ELEMENT

(75) Inventors: Raymond A. Vincent, Plymouth, MI (US); Randall P. Schmitt, Clinton Township, MI (US)

(73) Assignee: Masco Corporation of Indiana, Indianapolis, IN (US)

( * ) Notice: Subject to any disclaimer, the term of this patent is extended or adjusted under 35 U.S.C. 154(b) by 27 days.

(21) Appl. No.: 10/797,519

(22) Filed: Mar. 10, 2004

(65) Prior Publication Data

US 2005/0199839 A1    Sep. 15, 2005

(51) Int. Cl.
*F16K 31/12*    (2006.01)

(52) U.S. Cl. ............... 251/30.01; 251/65; 251/209

(58) Field of Classification Search .............. 251/65, 251/209, 208, 30.01, 30.02, 30.05, 129.11, 251/129.12, 129.13
See application file for complete search history.

(56) References Cited

U.S. PATENT DOCUMENTS

| | | | |
|---|---|---|---|
| 3,818,284 A | 6/1974 | de Versterre | |
| 4,131,128 A * | 12/1978 | Gotzenberger | 251/209 |
| 4,510,963 A | 4/1985 | Presley | |
| 4,892,286 A | 1/1990 | Reinicke | |
| 4,896,085 A | 1/1990 | Jones | |
| 5,020,771 A * | 6/1991 | Nakatsukasa et al. | 251/30.02 |
| 5,065,718 A * | 11/1991 | Suzuki et al. | 251/30.03 |
| 5,294,089 A | 3/1994 | LaMarca | |
| 5,464,041 A | 11/1995 | Reinicke | |
| 5,842,680 A * | 12/1998 | Bustamante et al. | 251/65 |
| 5,915,665 A * | 6/1999 | Paese et al. | 251/65 |
| 5,915,667 A | 6/1999 | Kim | |
| 6,053,472 A | 4/2000 | DeLand | |
| 6,082,703 A * | 7/2000 | Fava et al. | 251/30.03 |
| 6,155,654 A | 12/2000 | Oyama | |
| 6,179,268 B1 | 1/2001 | Seid | |
| 6,477,026 B1 | 11/2002 | Lemke | |

OTHER PUBLICATIONS

The ERL Research Summary for 2001; Chapter 7: Power and Electronics Systems (9 pgs).
Axiomatic Technologies Corporation (13 pgs).

* cited by examiner

*Primary Examiner*—John Bastianelli

(57) ABSTRACT

A pilot valve has: an input passageway, an output passageway, a rotatable shaft disposed between them, a permanent magnet affixed to the rotatable shaft, an electromagnet, a control element, and a failsafe magnet. The rotatable shaft has a slot that gives the rotatable shaft a varied cross-section as a function of its position. The slot is disposed to permit fluid to flow between the input passageway and the output passageway except when the rotatable shaft is in a closed position. The electromagnet is disposed to generate first magnetic field that, via the permanent magnet, drives the rotatable shaft away from the closed position. The control element places a PWM current on the electromagnet, such that the length of the duty cycle controls the strength of the first magnetic field. The failsafe magnet is disposed to generate a second magnetic field that drives the rotatable shaft away from the closed position.

15 Claims, 2 Drawing Sheets

LOW ENERGY FLUID ACTUATOR CONTROL ELEMENT

BACKGROUND

1. Field of the Invention

The present invention generally relates generally to the field of fluid control elements. More particularly, the present invention relates to the field of low-energy electrical water flow control devices that conserve energy and reduce the waste of water.

2. Description of the Related Art

Automatic faucets have become popular for a variety of reasons. They save water, because water can be run only when needed. For example, with a conventional sink faucet, when a user washes their hands the user tends to turn on the water and let it run continuously, rather than turning the water on to wet their hands, turning it off to lather, then turning it back on to rinse. In public bathrooms the ability to shut off the water when the user has departed can both save water and help prevent vandalism.

One early version of an automatic faucet was simply a spring-controlled faucet, which returned to the "off" position either immediately, or shortly after, the handle was released. The former were unsatisfactory because a user could only wash one hand at a time, while the later proved to be mechanically unreliable.

A better solution were hands-free faucets. These faucets employed a proximity detector and an electric power source to activate water flow without the need for a handle. In addition to helping to conserve water and prevent vandalism, hands-free faucets also had additional advantages, some of which began to make them popular in homes, as well as public bathrooms. For example, there is no need to touch the faucet to activate it; with a conventional faucet, a user with dirty hands may need to wash the faucet after washing their hands. In public facilities non-contact operation is also more sanitary. Hands-free faucets also provide superior accessibility for the disabled, or for the elderly, or those who need assisted care.

Typically, these faucets use active infra-red ("IR") detectors in the form of photodiode pairs to detect the user's hands (or other objects positioned in the sink for washing). Pulses of IR light are emitted by one diode with the other being used to detect reflections of the emitted light off an object in front of the faucet. Different designs use different locations on the spout for the photodiodes, including placing them at the head of the spout, farther down the spout near its base, or even at positions entirely separate from the spout.

For both safety and cost reasons it is preferable to use battery power to operate hands-free faucets, so power consumption is an important design consideration. Because the detection devices require very little power to operate, the most significant power consumption comes from the mechanical operation of the valve to physically regulate the flow of water.

Naturally, the mechanical operation of the valve must be suitable for electronic control, since it must be responsive to the output of the IR detectors. Proportional control valves provide a useful means for electronic control of the valve mechanism. An example of a proportional control valve mechanism (used to control fluid flow in a water heater) is disclosed in U.S. Pat. No. 5,020,771 to Nakatsukasa, which is hereby incorporated herein in its entirety.

FIG. 1 is a diagram of a proportional control valve mechanism, indicated generally at 100. The proportional control valve mechanism 100 includes a main valve 120, which provides the main mechanical control of the flow, and a pilot valve 140, which is used to regulate the main valve 120. Fluid enters the proportional control valve mechanism 100 at 101, and travels through a main passageway 103, which leads to a first chamber 110.

The chamber is defined in part by the main valve 120, and by a first side of a diaphragm 112 that is approximately the same size as the main valve 120 opposite the main valve 120. The diaphragm 112 is connected to the main valve 120 by a shaft 122. Because the main valve 120 and the diaphragm 112 are approximately the same size, pressure in the chamber 110 results in an equal and opposite force on the shaft 122.

A portion of the main flow is diverted to the pilot valve 140 through a first bypass passageway 105. The pilot valve 140 is connected to a solenoid 142, which operates the pilot valve 140 in response to an electronic signal, such as a dithered pulse-width modulated ("PWM") signal.

When the pilot valve 140 is open, the diverted flow passes through a second bypass passageway 107 into a second chamber 109. The second chamber 109 is defined in part by a second side of the diaphragm 112, opposite the first chamber 110, and contains an orifice 111 that permits the diverted fluid to return to the main flow downstream of the main valve 120. Consequently, when the pilot valve 140 is opened pressure on the second side of the diaphragm generates force that disturbs the balance of forces on the shaft 122 from the pressure within the first chamber 110. The magnitude of the pressure in the second chamber 109 is a function of the size of the orifice 111 and the size of the aperture created by opening the pilot valve 140. Thus, the net force on the shaft 122, and hence how far it will deform the diaphragm 112 and open the main valve 140, can be controlled by controlling the flow through the pilot valve 140.

Because the pilot valve can be substantially smaller than the main valve, it can experience less force from the fluid pressure, and require less energy to actuate. Furthermore, even a relatively small displacement in the pilot valve 140 can produce enough pressure to cause a substantial displacement in the main valve 120. Consequently, the actuation of the pilot valve 140 requires substantially less power than it would require to actuate the main valve 120.

Nevertheless, the proportional control valve mechanism 100 requires continuous power in order to maintain flow. When power to the solenoid 142 is cut, the diverted flow forces the pilot valve 140 closed. Since the second chamber 109 has an orifice, fluid will exit through it until there is no internal pressure. Consequently, the diaphragm 112 returns to its undeformed position, and the main valve is closed. In applications in which power is supplied by batteries, the continuous draw of power to maintain flow leads to the need to replace batteries relatively frequently.

Thus, what is needed is a means to regulate the flow of water in a hands-free faucet which draws very little power, to reduce the frequency with which batteries must be replaced. In particular, there is a need for a means to regulate the flow of water in a hands-free faucet which does not draw power during steady-state operation—that is, it only draws power to change the flow rate. The present invention is directed towards meeting these needs, among others.

SUMMARY OF THE INVENTION

A low-energy fluid actuator control element according to the present invention provides a means for electronic control of a fluid flow, such as is needed for hands-free water faucets, that will require a less frequent changing of batteries. A control element according to the present invention requires very little power to change the rate of fluid flow and, once a flow rate is established, requires no power at all to maintain that flow rate. In the preferred embodiment, even if power is interrupted the control element will shut off fluid flow, so the controlled valve will not be stuck in an open position.

In a first embodiment, a fluid actuator for regulating fluid flow according to the present invention comprises: a main fluid passageway, a main valve, a chamber, and a pilot valve. The main fluid passageway is defined at least in part by a diaphragm, which has an inside facing inwardly relative to the main passageway, and an outside facing outwardly relative to the main passageway. The main valve is disposed to inhibit fluid flow through the main fluid passageway, and is connected to the diaphragm by a rigid member. The main valve is disposed to open outwardly from the main fluid passageway, such that pressure within the main passageway tends to hold the main valve closed, and pressure on the outside of the diaphragm tends to push open the main valve. The chamber is defined in part by the outside of the diaphragm. The pilot valve comprises: an input passageway, an output passageway, a rotatable shaft disposed between them, a permanent magnet affixed to the rotatable shaft, an electromagnet, a control element, and a failsafe magnet. The input passageway diverts a portion of the fluid flow from the main fluid passageway, and the output passageway directs the diverted portion of the fluid flow to the chamber. The rotatable shaft has a slot therein that gives the rotatable shaft a varied cross-section as a function of its angular position. The slot is disposed to permit fluid to flow between the input passageway and the output passageway except when the rotatable shaft is in a closed position. The electromagnet is disposed to generate first magnetic field that, via the permanent magnet, drives the rotatable shaft away from the closed position. The control element places a dithered PWM current on the electromagnet, such that the length of the duty cycle controls the strength of the first magnetic field. The failsafe magnet disposed to generate a second magnetic field that drives the rotatable shaft away from the closed position.

In a second embodiment, a pilot valve according to the present invention comprises: an input passageway, an output passageway, a rotatable shaft disposed between them, a permanent magnet affixed to the rotatable shaft, an electromagnet, a control element, and a failsafe magnet. The rotatable shaft has a slot therein that gives the rotatable shaft a varied cross-section as a function of its angular position. The slot is disposed to permit fluid to flow between the input passageway and the output passageway except when the rotatable shaft is in a closed position. The electromagnet is disposed to generate first magnetic field that, via the permanent magnet, drives the rotatable shaft away from the closed position. The control element places a dithered PWM current on the electromagnet, such that the length of the duty cycle controls the strength of the first magnetic field. The failsafe magnet is disposed to generate a second magnetic field that drives the rotatable shaft away from the closed position.

In a third embodiment, a hands-free water faucet according to the present invention comprises: at least one main water passageway, a flap valve, a chamber, and a pilot valve. The at least one main water passageway is defined at least in part by a diaphragm having an inside facing inwardly relative to the main passageway, and an outside facing outwardly relative to the main passageway. The flap valve is disposed to inhibit fluid flow through the at least one main water passageway, and is connected to the diaphragm by a rigid member. The flap valve is disposed to open outwardly from the main fluid passageway, such that pressure within the main passageway tends to hold the flap valve closed, and pressure on the outside of the diaphragm tends to push open the flap valve. The chamber is defined in part by the outside of the diaphragm. The pilot valve comprises: an input passageway, an output passageway, a rotatable shaft between them, a permanent magnet affixed to the shaft, an electromagnet, a control element, and a failsafe magnet. The input passageway diverts a portion of water flow from the at least one main water passageway. The output passageway directs the diverted portion of the water flow to the chamber. The rotatable shaft has a slot therein that gives the rotatable shaft a varied cross-section as a function of its angular position. The slot is disposed to permit water to flow between the input passageway and the output passageway except when the rotatable shaft is in a closed position. The electromagnet is disposed to generate a first magnetic field that, via the permanent magnet, drives the rotatable shaft away from the closed position. The control element places a current signal on the electromagnet that controls the strength of the first magnetic field. The failsafe magnet disposed to generate a second magnetic field that drives the rotatable shaft away from the closed position.

BRIEF DESCRIPTION OF THE DRAWINGS

Although the characteristic features of this invention will be particularly pointed out in the claims, the invention itself, and the manner in which it may be made and used, may be better understood by referring to the following descriptions taken in connection with the accompanying figures forming a part hereof.

DETAILED DESCRIPTION OF THE PREFERRED EMBODIMENT

For the purposes of promoting an understanding of the principles of the invention, reference will now be made to the preferred embodiment and specific language will be used to describe the same. It will nevertheless be understood that no limitation of the scope of the invention is thereby intended. Such alternations and further modifications in the invention, and such further applications of the principles of the invention as described herein as would normally occur to one skilled in the art to which the invention pertains, are contemplated, and desired to be protected.

A low-energy fluid actuator control element according to the present invention provides a means for electronic control of a fluid flow, such as is needed for hands-free water faucets, that will require less frequent changing of batteries. A control element according to the present invention requires little power to change the rate of fluid flow and, once a flow rate is established, requires no power at all to maintain that flow rate. In the preferred embodiment, even if power is interrupted the control element will shut off fluid flow, so the controlled valve will not be stuck in an open position.

Figure 1:
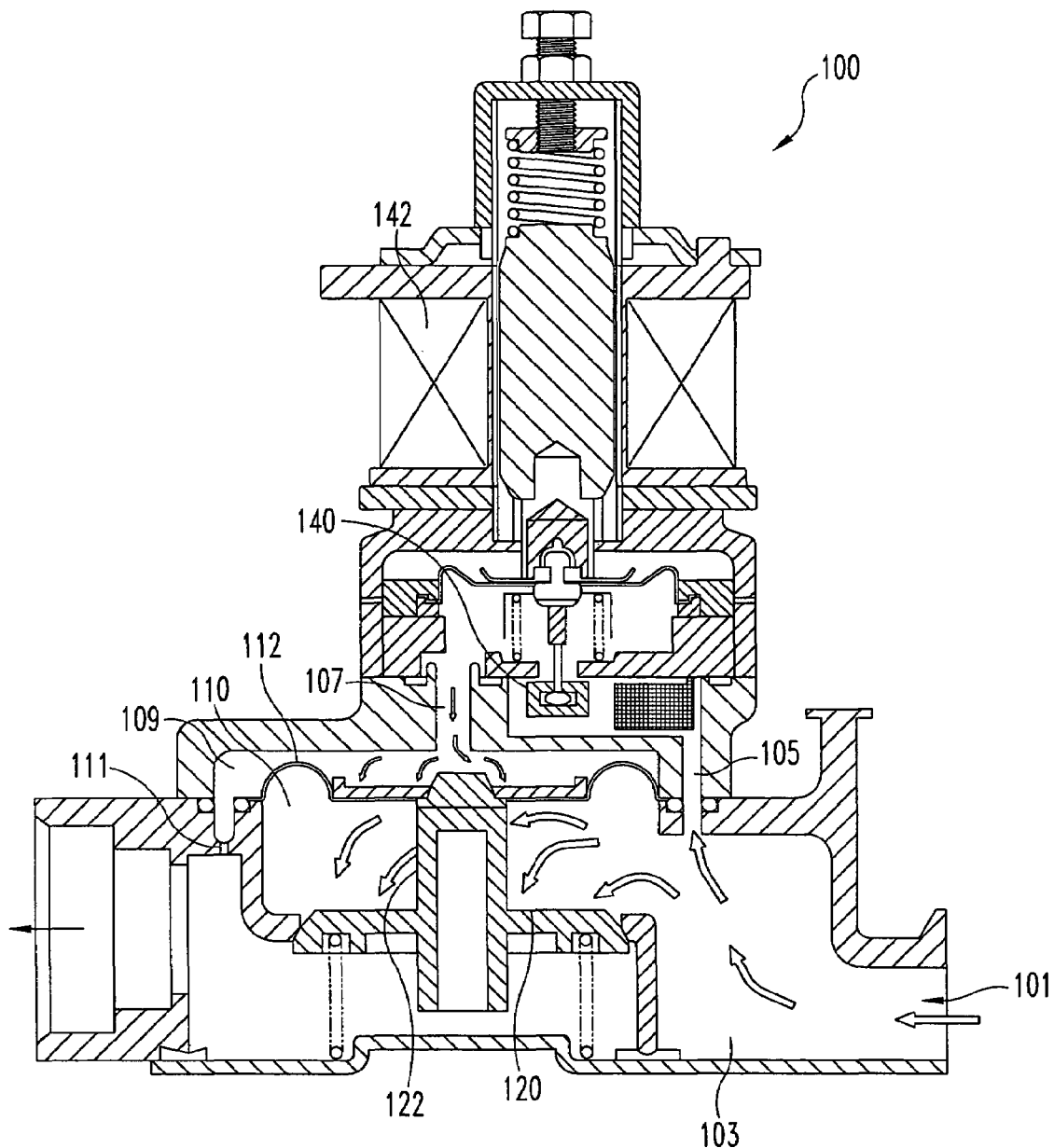
FIG. 1 is a cross sectional view of a prior art proportional control valve mechanism.
Figure 2:
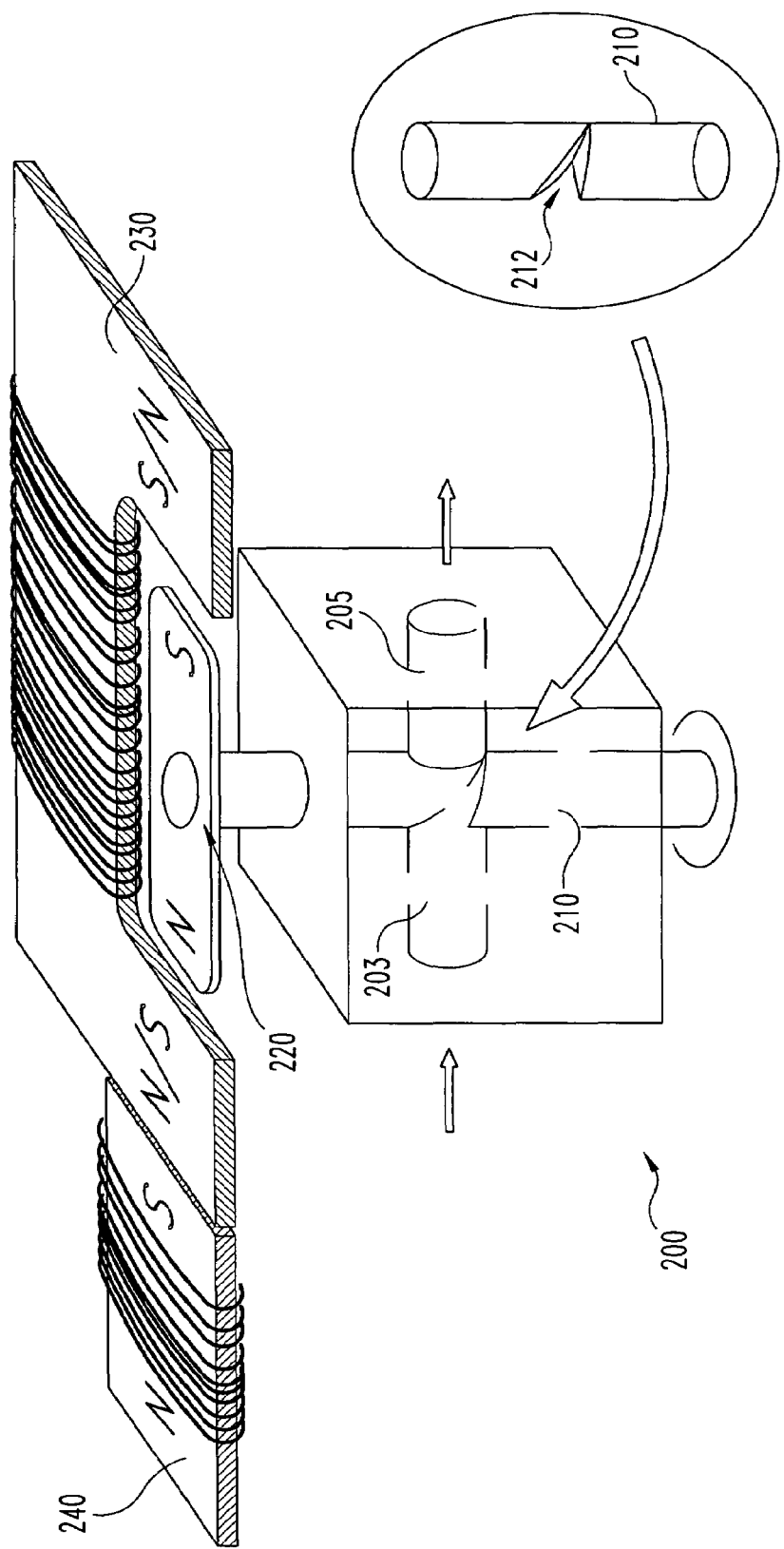
FIG. 2 is an illustration of a preferred embodiment low-energy fluid actuator control element according to the present invention.

FIG. 2 illustrates a preferred embodiment pilot valve suitable for use in a proportional control valve controlled hands-free faucet, indicated generally at 200. The pilot valve 200 receives a diverted flow through a input passageway 203, which is partially blocked by a variable slotted shaft 210, and outputs the diverted flow through an output passageway 205. The input passageway 203 and output passageway 205 are preferably on the order of 40–50 one-thousandths of an inch in diameter, while the variable slotted shaft is preferably on the order of 50–60 one-thousands of an inch in diameter. The output flow can be used to control a main valve by putting pressure on a diaphragm, analogously to the flow through the second bypass passageway 107 in the proportional control valve mechanism 100.

The variable slotted shaft 210 has a notch or slot 212 in it, such that as it is rotated, it presents a variable sized cross section. When the slot 212 is positioned perpendicularly to the input passageway 203 flow it completely closes off the flow; as it is rotated the cross section of the slot increases to permit greater flow, until a minimum pressure drop and maximum flow is reached at 90 degrees displacement. It will be appreciated that a hole can be used in lieu of a notch or slot; the specific shape of the cross section of the variable slotted shaft 210 is unimportant, so long as it presents a variable cross section as a function of its angular position with respect to the center line of input passageway 203.

It will be appreciated that the pressure from the fluid passing the variable slotted shaft is approximately symmetrical; i.e., the torque on the variable slotted shaft 210 produced by the water pressure on one side of its axis of rotation is the same as the torque on the other side of its axis of rotation. Although pressure differences resulting from different differential flow rates or from turbulence near the surface of the slot 212 could conceivably destroy the symmetry of torque, any small amount of resulting torque is outweighed by friction. Consequently, when no external force is applied on the variable slotted shaft 210 it will remain in its present position, regardless of the flow rate. Thus, once positioned, no energy is required to maintain the variable slotted shaft 210 in its position.

Although the input passageway 203 and output passageway 205 are preferably axially aligned, this is not necessary. For example, these passageways can be perpendicularly aligned with respect to each other and the variable slotted shaft 210. Any arrangement in which the flow from the input passageway 203 to the output passageway 205 may be used, though it will be appreciated that the shape of the slot 212 must be selected to permit the flow to be arrested in at least one closed position, and preferably to provide a monotonically increasing flow through some range of angular displacement of slotted shaft 210 away from a closed position.

In the presently preferred embodiment the variable slotted shaft 210 is affixed to a permanent magnet 220, which is actuated by an electromagnet 230. Referring to FIG. 2, the permanent magnet 220 and variable slotted shaft are oriented such that, when the permanent magnet 220 is aligned as shown the slot 212 is perpendicular to the passageways 203 and 205, such that fluid flow is completely shut off.

The electromagnet 230 is regulated by a dithered PWM signal. The dithered PWM signal permits the generation of a variable-strength magnetic field that will drive the variable slotted shaft 210 (via the permanent magnet 220) away from the closed position shown in FIG. 2.

An opposing magnetic field tends to drive the variable slotted shaft 210 back towards the closed position. The opposing magnetic field can be supplied in a number of ways. In certain embodiments, a failsafe permanent magnet 240 is positioned in the vicinity, oriented as shown in FIG. 2. Alternatively, the failsafe magnet 240 can be an electromagnet. The PWM signal can be used to direct a DC current through the coils of the electromagnet 230 during the on-duty portions of the cycle, and through the oppositely wound coils of the failsafe magnet 240 during the off-duty portions of the cycle. In still other alternatives, the failsafe magnet 240 and electromagnet can be combined into a single electromagnet, and the direction of DC current through the coils can be reversed during off-duty and on-duty portions of the cycle, for example using transistor switches, as is known in the art.

In those embodiments that lack a permanent failsafe magnet 240 an alternative failsafe mechanism is preferably included in the circuitry controlling the electromagnet 230. For example, a capacitor failsafe system, such as are known in the art, can be used. In such systems, a capacitor is held charged by the DC current that powers the electromagnet 230 during the on-duty portions of the cycle. When power is lost, the power in the capacitor can be discharged to power the electromagnet 230 in the opposite polarity long enough to return the variable slotted shaft 210 to the closed position.

It will be appreciated that a hands-free water faucet can employ a pair of low-energy fluid actuator control elements according to the present invention in order to regulate a hot and cold water supplies independently, as a means to regulate the temperature of water discharged from a single spout. In such applications the PWM signal that corresponds to the proper flow rate for the hot and cold water supplies can be retained in electronic memory and used as default values when an IR detector activates the faucet.

While the invention has been illustrated and described in detail in the drawings and foregoing description, the description is to be considered as illustrative and not restrictive in character. Only the preferred embodiments, and such alternative embodiments deemed helpful in further illuminating the preferred embodiment, have been shown and described. All changes and modifications that come within the spirit of the invention are desired to be protected.

We claim:

1. A fluid actuator for regulating fluid flow, the actuator comprising:
   a main fluid passageway, defined at least in part by a diaphragm having an inside facing inwardly relative to the main passageway, and an outside facing outwardly relative to the main passageway;
   a main valve disposed to inhibit fluid flow through the main fluid passageway, the main valve being connected to the diaphragm by a rigid member, and the main valve being disposed to open outwardly from the main fluid passageway, such that pressure within the main passageway tends to hold the main valve closed, and pressure on the outside of the diaphragm tends to push open the main valve;
   a chamber defined in part by the outside of the diaphragm; and
   a pilot valve, comprising:
      an input passageway that diverts a portion of the fluid flow from the main fluid passageway;
      an output passageway that directs the diverted portion of the fluid flow to the chamber;
      a rotatable shaft disposed between the input and output passageways, the rotatable shaft having a slot therein that gives the rotatable shaft a varied cross-section as a function of its angular position, the slot being disposed to permit fluid to flow between the input passageway and the output passageway except when the rotatable shaft is in a closed position;

a permanent magnet affixed to the rotatable shaft;

an electromagnet disposed to generate first magnetic field that, via the permanent magnet, drives the rotatable shaft away from the closed position;

a control element that places a dithered PWM current on the electromagnet, such that the length of the duty cycle controls the strength of the first magnetic field;

a second magnet disposed to generate a second magnetic field that drives the rotatable shaft away from the closed position.

2. The fluid actuator of claim 1, wherein the second magnet is a failsafe magnet that returns the rotatable shaft to the closed position when power is lost.

3. The fluid actuator of claim 1, wherein the second magnet is a second permanent magnet.

4. The fluid actuator of claim 1, wherein the second magnet is a second electromagnet that receives current during the off-duty portion of the dithered PWM current.

5. The fluid actuator of claim 1, wherein the second magnet comprises the electromagnet receiving a current with an amplitude opposite the amplitude of the PWM current during the off-duty portions of the PWM current.

6. A pilot valve for a proportional control valve mechanism, the pilot valve comprising:

an input passageway that receives a fluid;

an output passageway that outputs the fluid;

a rotatable shaft disposed between the input and output passageways, the rotatable shaft having a slot therein that gives the rotatable shaft a varied cross-section as a function of its angular position, the slot being disposed to permit fluid to flow between the input passageway and the output passageway except when the rotatable shaft is in a closed position;

a permanent magnet affixed to the rotatable shaft;

an electromagnet disposed to generate first magnetic field that, via the permanent magnet, drives the rotatable shaft away from the closed position;

a control element that places a dithered PWM current on the electromagnet, such that the length of the duty cycle controls the strength of the first magnetic field;

a second magnet disposed to generate a second magnetic field that drives the rotatable shaft away from the closed position.

7. The fluid actuator of claim 6, wherein the second magnet is a failsafe magnet that returns the rotatable shaft to the closed position when power is lost.

8. The fluid actuator of claim 6, wherein the second magnet is a second permanent magnet.

9. The fluid actuator of claim 6, wherein the second magnet is a second electromagnet that receives current during the off-duty portion of the dithered PWM current.

10. The fluid actuator of claim 6, wherein the second magnet comprises the electromagnet receiving a current with an amplitude opposite the amplitude of the PWM current during the off-duty portions of the PWM current.

11. A hands-free water faucet, comprising:

at least one main water passageway, defined at least in part by a diaphragm having an inside facing inwardly relative to the main passageway, and an outside facing outwardly relative to the main passageway;

a flap valve disposed to inhibit fluid flow through the at least one main water passageway, the flap valve being connected to the diaphragm by a rigid member, and the flap valve being disposed to open outwardly from the main fluid passageway, such that pressure within the main passageway tends to hold the flap valve closed, and pressure on the outside of the diaphragm tends to push open the flap valve;

a chamber defined in part by the outside of the diaphragm; and a pilot valve, comprising:

an input passageway that diverts a portion of water flow from the at least one main water passageway;

an output passageway that directs the diverted portion of the water flow to the chamber;

a rotatable shaft disposed between the input and output passageways, the rotatable shaft having a slot therein that gives the rotatable shaft a varied cross-section as a function of its angular position, the slot being disposed to permit water to flow between the input passageway and the output passageway except when the rotatable shaft is in a closed position;

a permanent magnet affixed to the rotatable shaft;

an electromagnet disposed to generate first magnetic field that, via the permanent magnet, drives the rotatable shaft away from the closed position;

a control element that places a current signal on the electromagnet that controls the strength of the first magnetic field;

a second magnet disposed to generate a second magnetic field that drives the rotatable shaft away from the closed position.

12. The fluid actuator of claim 11, wherein the second magnet is a failsafe magnet that returns the rotatable shaft to the closed position when power is lost.

13. The fluid actuator of claim 11, wherein the second magnet is a second permanent magnet.

14. The fluid actuator of claim 11, wherein the second magnet is a second electromagnet that receives current during the off-duty portion of the dithered PWM current.

15. The fluid actuator of claim 11, wherein the failsafe magnet comprises the electromagnet receiving a current with an amplitude opposite the amplitude of the PWM current during the off-duty portions of the PWM current.

* * * * *